US008566830B2

(12) United States Patent
Ringseth et al.

(10) Patent No.: US 8,566,830 B2
(45) Date of Patent: Oct. 22, 2013

(54) LOCAL COLLECTIONS OF TASKS IN A SCHEDULER

(75) Inventors: Paul F. Ringseth, Bellevue, WA (US); Niklas Gustafsson, Bellevue, WA (US); Genevieve Fernandes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1232 days.

(21) Appl. No.: 12/121,789

(22) Filed: May 16, 2008

(65) Prior Publication Data

US 2009/0288086 A1 Nov. 19, 2009

(51) Int. Cl.
*G06F 9/30* (2006.01)
*G06F 9/32* (2006.01)
*G06F 9/38* (2006.01)

(52) U.S. Cl.
USPC .......................................... 718/102; 718/108

(58) Field of Classification Search
None
See application file for complete search history.

(56) References Cited

U.S. PATENT DOCUMENTS

| | | | | |
|---|---|---|---|---|
| 5,349,656 | A * | 9/1994 | Kaneko et al. | 718/102 |
| 5,692,193 | A | 11/1997 | Jagannathan et al. | |
| 6,952,827 | B1 * | 10/2005 | Alverson et al. | 718/104 |
| 2002/0069328 | A1 * | 6/2002 | Chauvel | 711/130 |
| 2003/0037091 | A1 | 2/2003 | Nishimura et al. | |
| 2004/0154021 | A1 | 8/2004 | Sangili | |
| 2005/0108711 | A1 | 5/2005 | Arnold et al. | |
| 2005/0125629 | A1 | 6/2005 | Kissell | |
| 2006/0004942 | A1 | 1/2006 | Hetherington et al. | |
| 2006/0123420 | A1 | 6/2006 | Nishikawa et al. | |
| 2006/0130062 | A1 | 6/2006 | Burdick et al. | |
| 2006/0168214 | A1 | 7/2006 | Armstrong et al. | |
| 2006/0277551 | A1 | 12/2006 | Accapadi et al. | |
| 2007/0204268 | A1 | 8/2007 | Drepper | |
| 2008/0148291 | A1 * | 6/2008 | Huang et al. | 719/320 |
| 2008/0189709 | A1 * | 8/2008 | Amin | 718/102 |
| 2009/0055829 | A1 * | 2/2009 | Gibson | 718/103 |

FOREIGN PATENT DOCUMENTS

| | | |
|---|---|---|
| JP | 2-171952 | 7/1990 |
| JP | 6-214811 | 8/1994 |
| JP | 11-259318 | 9/1999 |
| JP | 2007-179100 | 7/2007 |

OTHER PUBLICATIONS

Boris Weissman, "Active Threads: an Extensible and Portable Light-Weight Thread System", TR-97-036, Sep. 1997. International Computer Science Institute, Berkeley California.*
A PCT Search Report for Application No. PCT/US2009/038662 mailed on Mar. 27, 2009 (11 pages).
The International Preliminary Report on Patentability for International Application No. PCT/US2009/038662 mailed Nov. 25, 2010 (6 pages).

(Continued)

*Primary Examiner* — Eric Coleman

(57) ABSTRACT

A scheduler in a process of a computer system includes a local collection of tasks for each processing resource allocated to the scheduler and at least one general collection of tasks. The scheduler assigns each task that becomes unblocked to the local collection corresponding to the processing resource that caused the task to become unblocked. When a processing resource becomes available, the processing resource attempts to execute the most recently added task in the corresponding local collection. If there are no tasks in the corresponding local collection, the available processing resource attempts to execute a task from the general collection.

19 Claims, 5 Drawing Sheets

(56) References Cited

OTHER PUBLICATIONS

Sen, "Dynamic Processor Allocation for Adaptively Parallel Work-Stealing Jobs", Master's Thesis, Massachusetts Institute of Technology, Submitted to the Department of Electrical Engineering and Computer Science, Dated: Sep. 2004, pp. 1-82.

Gautier, et al., "KAAPI: A Thread Scheduling Runtime System for Data Flow Computations on Cluster of Multi-Processors.", International Conference on Symbolic and Algebraic Computation, Proceedings of the 2007 international workshop on Parallel symbolic computation, London, Ontario, Canada, Dated: Jul. 27-28, 2007, pp. 15-23.

Weissman, et al., "Active Threads: Enabling Fine-Grained Parallelism in Object-Oriented Languages", International Conference on Parallel and Distributed Processing Techniques and Applications (PDPTA '98), Dated: 1998, Las Vegas, pp. 1-8.

Uhlig, et al., "Towards Scalable Multiprocessor Virtual Machines", VM '04 Paper [VM '04 Technical Program], This paper was originally published in the Proceedings of the 3rd Virtual Machine Research and Technology Symposium, May 6-7, 2004, San Jose, CA, USA, http://www.usenix.org/events/vm04/tech/full_papers/uhlig/uhlig_html/index.html.

A translation for the Notice of Rejection for Patent Application No. 2011-509510 dispatched Aug. 2, 2013 (6 pgs.).

\* cited by examiner

LOCAL COLLECTIONS OF TASKS IN A SCHEDULER

BACKGROUND

Processes executed in a computer system may include task schedulers that schedule tasks of processes for execution in the computer system. These schedulers may operate with various algorithms that determine how tasks of a process are to be executed. The algorithms, however, may not take full advantage of the underlying hardware topology of the computer system. For example, the algorithms may not fully exploit memory locality effects in a computer system with a memory hierarchy and multiple processors. As a result, a scheduler may not optimize the execution of a process in a computer system.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A scheduler in a process of a computer system includes a local collection of tasks for each processing resource allocated to the scheduler and at least one general collection of tasks. The scheduler assigns each task that becomes unblocked to the local collection corresponding to the processing resource that caused the task to become unblocked. When a processing resource becomes available, the processing resource attempts to execute the most recently added task in the corresponding local collection. If there are no tasks in the corresponding local collection, the available processing resource attempts to execute a task from the general collection or a local collection of another processing resource.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
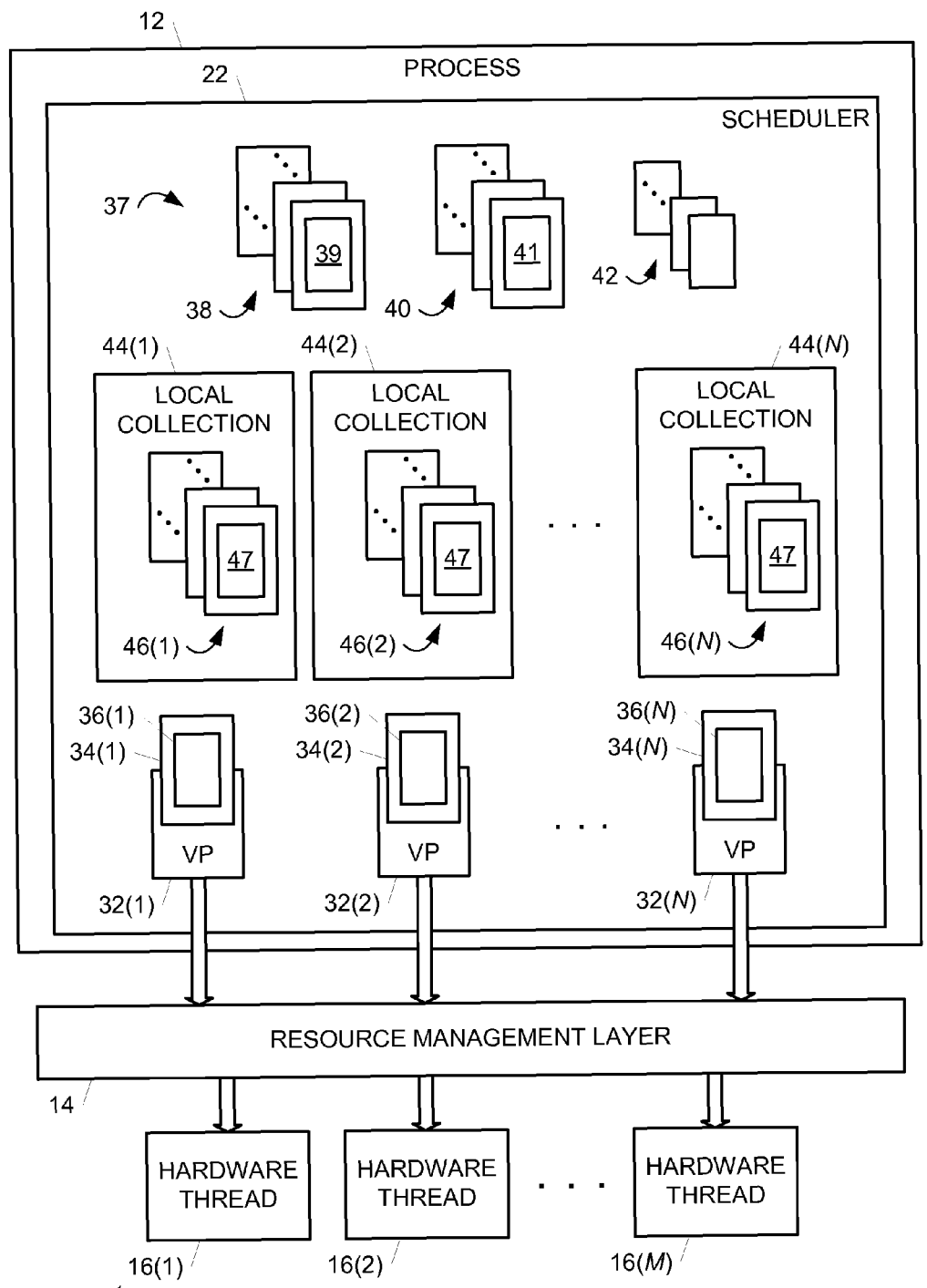
FIG. 1 is a block diagram illustrating an embodiment of a scheduler with local collections of tasks in a runtime environment.

FIG. 1 is a block diagram illustrating an embodiment of a task scheduler 22 in a process 12 of a runtime environment 10. Scheduler 22 includes a set of virtual processors 32(1)-32(N) with corresponding local collections of tasks 44(1)-44(N), where N is an integer greater than or equal to two and denotes the Nth virtual processor 32 or Nth local collection 44, as described in additional detail below.

Runtime environment 10 represents a runtime mode of operation in a computer system, such as embodiments 100A and 100B of a computer system 100 shown in FIGS. 6A and 6B and described in additional detail below, where the computer system is executing instructions. The computer system generates runtime environment 10 from a runtime platform such as a runtime platform 122 shown in FIG. 6A and described in additional detail below.

Runtime environment 10 includes an least one invoked process 12, a resource management layer 14, and a set of hardware threads 16(1)-16(M), where M is an integer that is greater than or equal to one and denotes the Mth hardware thread 16. Runtime environment 10 allows tasks from process 12 to be executed, along with tasks from any other processes that co-exist with process 12 (not shown), using resource management layer 14 and hardware threads 16(1)-16(M). Runtime environment 10 operates in conjunction with resource management layer 14 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads). Process 12 obtains access to the processing and other resources in the computer system (e.g., hardware threads 16(1)-16(M)) from resource management layer 14. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 exists separately from an operating system of the computer system (not shown in FIG. 1) in the embodiment of FIG. 1. In other embodiments, resource management layer 14 or some or all of the functions thereof may be included in the operating system.

Hardware threads 16 reside in execution cores of a set or one or more processor packages (e.g., processor packages 102 shown in FIG. 6 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specifies a policy for scheduler 22.

Scheduler 22 interacts with resource management layer 14 to negotiate processing and other resources of the computer system in a manner that is transparent to process 12. Resource management layer 14 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 includes the set of virtual processors 32(1)-32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

Figure 4:
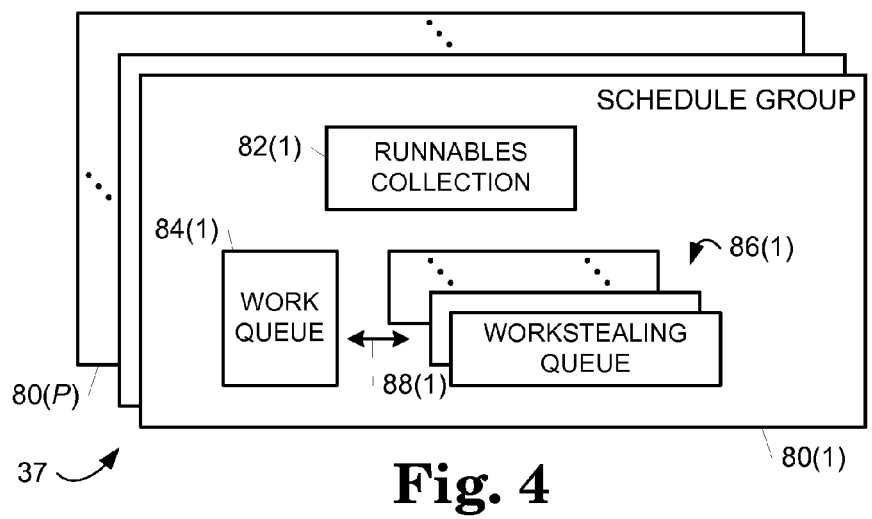
FIG. 4 is a block diagram illustrating an embodiment of schedule groups for use in a scheduler.

Scheduler 22 includes a general collection of tasks 37 and local collections of tasks 44(1)-44(N) where local collections 44(1)-44(N) correspond to respective virtual processors 32(1)-32(N). General collection 37 may be organized into any suitable type, number and/or combination of sub-collections of tasks. In one embodiment, general collection 37 may include a set of one or more schedule groups 80 as shown in the embodiment of FIG. 4 and described in additional detail below. In other embodiments, general collection 37 may be organized in other suitable ways.

The set of execution contexts in scheduler 22 includes a set of execution contexts 34(1)-34(N) with respective, associated tasks 36(1)-36(N) that are being executed by respective virtual processors 32(1)-32(N), a set of zero or more runnable execution contexts 38, and a set of zero or more blocked (i.e., wait-dependent) execution contexts 40. Each execution context 34, 38 and 40 includes state information that indicates whether an execution context 34, 38 and 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked include an associated task 41 and are waiting for data, a message, or an event that is being generated or will be generated by another execution context 34, 38, or 40.

The set of execution contexts in scheduler 22 also includes sets of runnable execution contexts 46(1)-46(N) in respective local collections 44(1)-44(N). Each execution context 46 has an associated task 47 that was unblocked by the execution of a task 36 where the task 36 was executed or is currently being executed on the virtual processor 32 corresponding to the local collection 44 that includes the execution context 46.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion on virtual processors 32 before picking up new tasks. An execution context 34 executing on a virtual processor 32 may also unblock other execution contexts 40 by generating data, a message, or an event that will be used by another execution context 40.

Each task in scheduler 22 may be realized (e.g., realized tasks 36 and 39), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 4 described below.

Upon completion, blocking, or other interruption (e.g., explicit yielding or forced preemption) of an execution context 34 running on a virtual processor 32, the virtual processor 32 becomes available to execute another realized task 39 or unrealized task 42. Scheduler 22 searches for a runnable execution context 38 or an unrealized task 42 to attach to the available virtual processor 32 for execution in any suitable way. For example, scheduler 22 may first search for a runnable execution context 38 to execute before searching for an unrealized task 42 to execute. Scheduler 22 continues attaching execution contexts 38 to available virtual processors 32 for execution until all execution contexts 38 of scheduler 22 have been executed.

Local collections 44 may allow scheduler 22 to exploit memory locality effects that may occur with hardware threads 16. In executing process 12, scheduler 22 assigns each wait-dependent execution context 40 with a task 41 that becomes unblocked to the local collection 44 corresponding to the processing resource (e.g., the combination of virtual processor 32 and hardware thread 16) that caused the task 41 to become unblocked. Unblocked tasks 41 with associated execution contexts 40 become runnable tasks 47 with associated execution contexts 46 in response to being added to a local collection 44.

When a processing resource (e.g., a virtual processor 32) becomes available, the processing resource attempts to execute the most recently added task 47 associated with an execution context 46 in the corresponding local collection 44 (i.e., the most recent task 47 unblocked by the processing resource). By doing so, scheduler 22 increases the likelihood that each unblocked task 47 will be able to take advantage of data stored high in the memory hierarchy of the processing resource caused the task 47 to become unblocked. As a result, the unblocked task 47 may execute more efficiently in the processing resource than in another processing resource that did not already include such data stored high in the memory hierarchy.

For example, if task 36(1) on execution context 34(1) unblocks a task 41 with an execution context 40 while being executed on hardware thread 16(1) via virtual processor 32(1), execution context 34(1) likely produces at least some data that the task 41 will consume. Because the production of the data by execution context 34(1) is likely to have caused the unblocking of the task 41, the data is likely high in the memory hierarchy of the hardware thread 16(1) (e.g., the data is hot within high levels of one or more caches accessible to hardware thread 16(1)). In this example, scheduler 22 assigns the unblocked task 41 and associated execution context 40 to local collection 44(1) to increase the likelihood that the unblocked task 41 will be executed by the same hardware thread 16(1) (via virtual processor 32(1)).

In one embodiment, local collections 44 are each implemented as workstealing queues to allow processing resources to steal tasks 47 with runnable execution contexts 46 from the local collections 44 of other processing resources as described in additional detail below. In this embodiment, a processing resource pops the most recently added task 47 and associated execution context 46 for execution when accessing the local collection 44 corresponding to the processing resource. When accessing a local collection 44 corresponding to another processing resource, a processing resource steals the least recently added task 47 and associated execution context 46 for execution. By doing so, scheduler 22 allows local collections 44 to be operated without locks or with minimal locking of local collections 44. In other embodiments, local collections 44 may be implemented as other types of collections.

Figure 2:
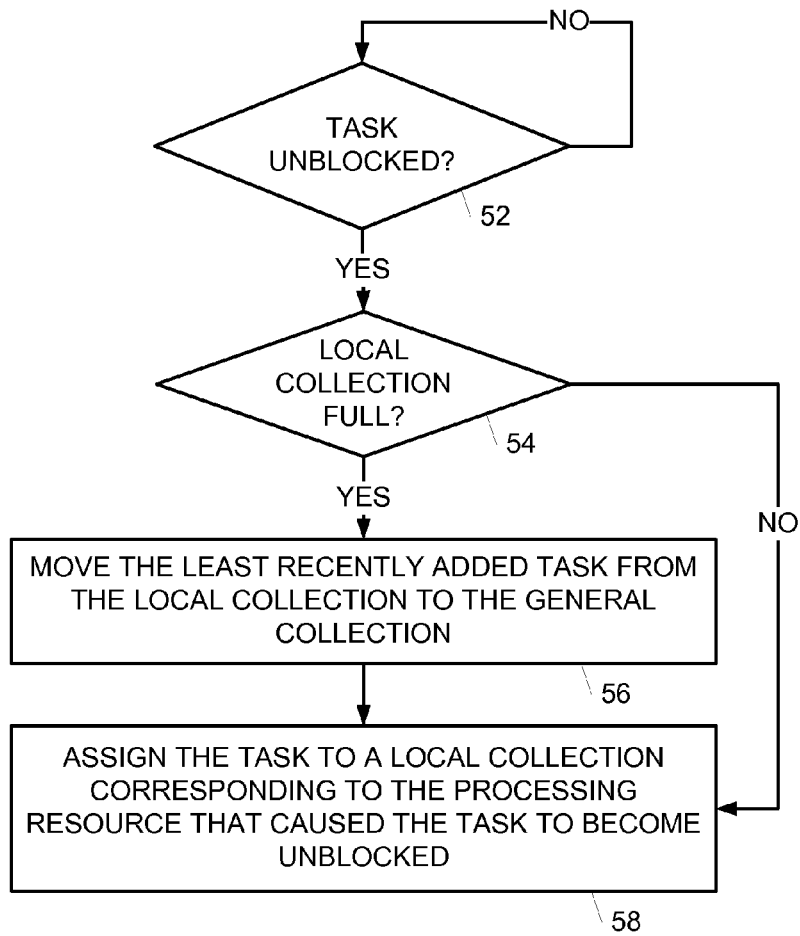
FIG. 2 is a flow chart illustrating an embodiment of a method for assigning execution contexts in a scheduler.

FIG. 2 is a flow chart illustrating an embodiment of a method for assigning wait-dependent execution contexts 40 in scheduler 22. The method of FIG. 2 will be described with reference to the embodiment of scheduler 22 in FIG. 1.

Scheduler 22 determines whether a task 41 with a wait-dependent execution context 40 becomes unblocked as indicated in a block 52. Scheduler 22 may perform this function continuously while causing process 12 to be executed. To make the determination, scheduler 22 detects that data, one or more messages, and/or one or more events that unblock the execution context 40 have been generated by a virtual processor 32 executing an execution context 34. Scheduler 22 also identifies the virtual processor 32 that caused the execution context 38 to become unblocked.

In response to determining that a task 41 with a wait-dependent execution context 40 becomes unblocked, scheduler 22 determines whether the local collection 44 corresponding to the virtual processor 32 that caused the execution context 40 to become unblocked is full as indicated in a block 54. Scheduler 22 may or may not limit the size of each local collection 44. For example, scheduler 22 may limit the number of execution contexts 46 stored in each local collection 44 to four.

If a local collection 44 is currently storing the maximum number of execution contexts 46 (i.e., the local collection 44 is full), then scheduler 22 moves the least recently added task 47 and associated execution context 46 from the local collection 44 to general collection 37 (e.g., to the set of execution contexts 38) as indicated in a block 56. Scheduler 22 removes the least recently added execution context 46 from the local collection 44 and adds the execution context 46 to general collection 37 to make room for the newly unblocked execution context 40. When spilling an execution context 46 over from a local collection 44 to general collection 37, scheduler 22 operates the local collection 44 as a FIFO (first-in-first-out) buffer to spill the least recently added execution context 46 in local collection 44 to general collection 37.

In other embodiments, scheduler 22 may add an unblocked task 41 and associated execution context 40 to general collection 37 when the local collection 44 is full.

In embodiments where general collection 37 includes two or more sub-collections, scheduler 22 may add the execution context 46 into a sub-collection associated with the virtual processor 32 corresponding to the local collection 44 from which the execution context 46 is being removed. The virtual processor 32 may be associated with the sub-collection by having most recently accessed the sub-collection to obtain a runnable execution context 38.

After ensuring that space exists for the unblocked task 41 in the local collection 44, scheduler 22 assigns the unblocked task 41 and associated execution context 40 to the local collection 44 corresponding to the virtual processor 32 that caused the task 41 to become unblocked as indicated in a block 58. Scheduler 22 adds the task 41 and associated execution context 40 into the local collection 44 such that the task 41 and associated execution context 40 becomes a most recently added one of the set of tasks 47 and associated execution contexts 46.

Figure 3:
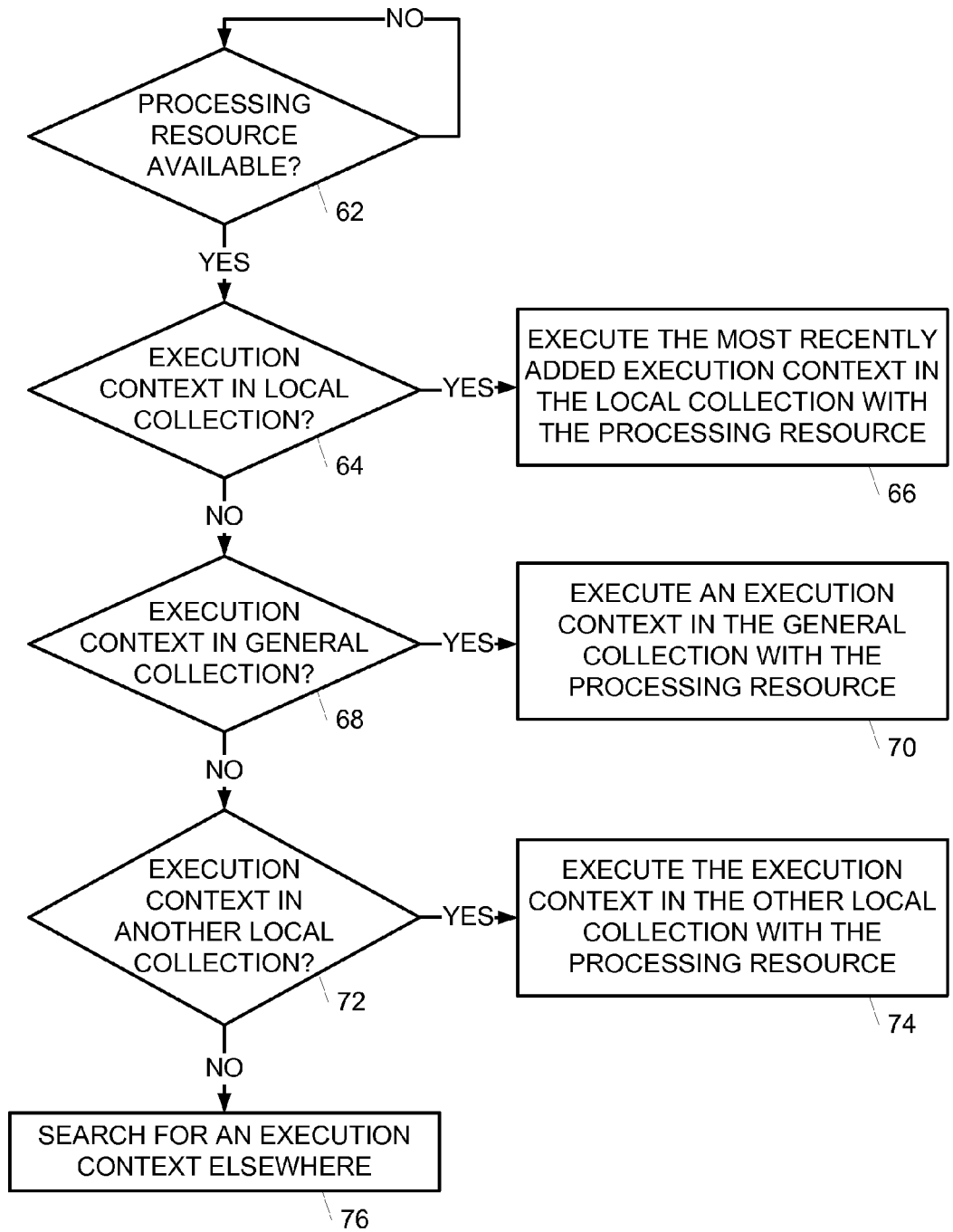
FIG. 3 is a flow chart illustrating an embodiment of a method for selecting execution contexts for execution.

FIG. 3 is a flow chart illustrating an embodiment of a method for selecting execution contexts for execution. The method of FIG. 3 will be described with reference to the embodiment of scheduler 22 in FIG. 1.

Scheduler 22 determines whether a virtual processor 32 becomes available as indicated in a block 62. Scheduler 22 may perform this function continuously while causing process 12 to be executed. Upon completion, blocking, or other interruption (e.g., explicit yielding or forced preemption) of an execution context 34 running on a virtual processor 32, the virtual processor 32 becomes available to execute another execution context 38 or 46 and/or another task 42.

When scheduler 22 determines that a virtual processor 32 becomes available, scheduler 22 begins a search for a runnable execution context to attach to the available virtual processor 32 for execution. Scheduler 22 first attempts to locate a runnable execution context 46 in the local collection 44 corresponding to the available virtual processor 32 as indicated in a block 64.

If a runnable execution context 46 is present in the local collection 44, then scheduler 22 causes the most recently added execution context 46 in the local collection 44 to be executed by the virtual processor 32 as indicated in a block 66. When a runnable execution context 46 is present in the local collection 44, scheduler 22 operates the local collection 44 as a LIFO (last-in-first-out) buffer to remove the most recently added execution context 46 for execution. The runnable execution context 46 is the most recently added execution context 46 in the local collection 44 and was unblocked by an execution context 34 executing on the virtual processor 32. As a result, the runnable execution context 46 may have the highest probability of having data related to the wait-dependency high in the memory hierarchy accessible to the hardware thread 16 corresponding to the virtual processor 32.

If a runnable execution context 46 is not present in the local collection 44, then scheduler 22 attempts to locate a runnable execution context 38 in general collection 37 as indicated in a block 68.

In embodiments where general collection 37 includes two or more sub-collections, scheduler 22 may attempt to locate a runnable execution context 38 in the sub-collection from which the available virtual processor 32 most recently obtained a runnable execution context 38.

If a runnable execution context 38 is present in the general collection 37, then scheduler 22 causes a runnable execution context 38 from the general collection 37 to be executed by the virtual processor 32 as indicated in a block 70.

If a runnable execution context 38 is not present in the general collection 37, then scheduler 22 attempts to locate a runnable execution context 46 in a local collection 44 corresponding to another virtual processor 32 of scheduler 22 as indicated in a block 72. In one embodiment, scheduler 22 accesses the local collections 44 corresponding to the other virtual processors 32 in a round-robin order until a runnable execution context 46 is located. In other embodiments, scheduler 22 accesses the local collections 44 corresponding to the other virtual processors 32 in other suitable orders.

If a runnable execution context 46 is present in a local collection of another virtual processor 32 of scheduler 22, then scheduler 22 causes the least recently added execution context 46 in the local collection 44 of the other virtual processor 32 to be executed by the available virtual processor 32 as indicated in a block 74. When a runnable execution context 46 is found in another local collection 44, scheduler 22 operates the other local collection 44 as a FIFO buffer to remove the least recently added execution context 46 for execution. Scheduler 22 thereby steals the least recently added execution context 46 in the local collection 44 and provides a mechanism for fairness and forward progress amongst the execution contexts 46 in local collections 44 of scheduler 22. In addition, scheduler 22 minimizes the interference with execution contexts 46 most likely to benefit from running on the other virtual processors 32 by popping the least recently added execution context 46 for execution.

If a runnable execution context 46 is not present in any of the local collections 44 of the other virtual processors 32 of scheduler 22, then scheduler 22 may search for a runnable execution context elsewhere as indicated in a block 76. For example, scheduler 22 may attempt to locate a runnable execution context 38 by searching other sub-collections of general collection 37 in a round-robin order in embodiments where general collection 37 includes two or more sub-collections. As another example, scheduler 22 may search one or more work-stealing queues (not shown) of one or more sub-collections of general collection 37 to located unrealized tasks 42 that may be runnable. When a runnable execution context or other runnable task 42 is located, scheduler 22 causes the runnable execution context or other runnable task 42 to be executed by the available virtual processor 32.

One embodiment of sub-collections of general collection 37 will now be described with reference to FIG. 4. FIG. 4 is a block diagram illustrating an embodiment of sub-collections configured as schedule groups 80(1)-80(P) for use in scheduler 22 by runtime environment 10.

Process 12 may group tasks into schedule groups 80(1)-80 (P) such that each schedule group 80 includes a grouping of related execution contexts or tasks and is used to provide a structure for locality of work, fairness, and/or forward progress. The grouping may be due to logically related work (e.g., a collection of tasks descending from a common root task), hardware topology (e.g., a non-uniform memory architecture (NUMA)), or a combination thereof. Schedule groups 80 may allow scheduler 22 to improve scalability, locality, and fairness.

Each schedule group 80 includes a runnables collection 82, a work queue 84, and a set of zero or more worksteeling queues 86. Each runnables collection 82 contains a list of runnable execution contexts 38. Scheduler 22 adds execution contexts to runnables collections 82 when new runnable execution contexts are presented to scheduler 22 by process 12 or when runnable execution contexts 46 are spilled over from a local collection 44 into general collection 37 as described above. Work queue 84 contains a list of worksteeling queues 86 as indicated by an arrow 88 and tracks the execution contexts 34 that are executing tasks 42 from the worksteeling queues 86. Each worksteeling queue 86 includes one or more unrealized tasks 42.

Figure 5A:
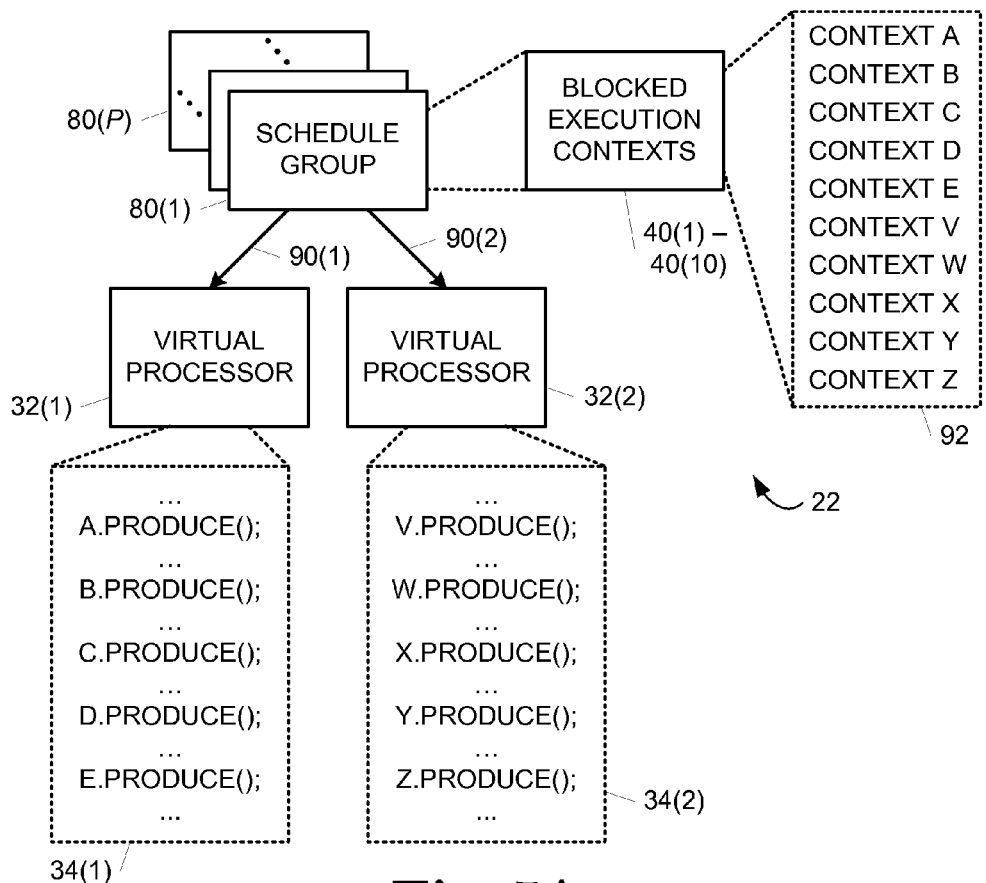
FIGS. 5A-5B are block diagrams illustrating embodiments of executing execution contexts in a scheduler with local collections of tasks.
Figure 5B:
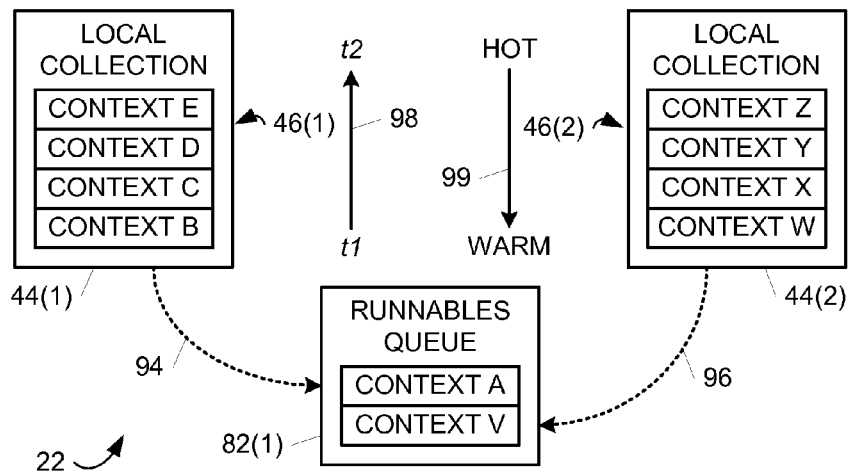

The use of schedule groups 80 in the embodiment of FIG. 1 will now be described with reference to an example in FIGS. 5A-5B. FIGS. 5A-5B are block diagrams illustrating embodiments of executing execution contexts in scheduler 22 with local collections 44.

In the example of FIG. 5A, virtual processors 32(1) and 32(2) are currently executing respective execution contexts 34(1) and 34(2) from schedule group 80(1) as indicated by respective arrows 90(1) and 90(2). Schedule group 80(1) includes ten wait-dependent execution contexts 40(1)-40 (10)—contexts A, B, C, D, E, V, W, X, Y, and Z—as shown in a box 92.

Execution context 34(1) unblocks five of the execution contexts 40(1)-40(5)—contexts A, B, C, D, and E—by executing functions that produce data, one or more messages, or one or more events for the blocked execution contexts 40(1)-40(5). The function A.PRODUCE( ) produces data or a message for blocked execution context A, B.PRODUCE( ) produces data or a message for blocked execution context B, and so on.

Similarly, Execution context 34(2) unblocks five of the execution contexts 40(6)-40(10)—contexts V, W, X, Y, and Z—by executing functions that produce data or a message for the blocked execution contexts 40(6)-40(10). The function V.PRODUCE( ) produces data or a message for blocked execution context V, W.PRODUCE( ) produces data or a message for blocked execution context W, and so on.

As described above with reference to FIG. 2, scheduler adds each execution context 40(1)-40(5) unblocked by virtual processor 32(1) onto local collection 44(1) and into the set of runnable execution contexts 46(1) in the order of unblocking as shown in FIG. 5B. Similarly, scheduler pushes each execution context 40(6)-40(10) unblocked by virtual processor 32(2) onto local collection 44(2) and into the set of runnable execution contexts 46(2) in the order of unblocking.

In the example of FIG. 5B, each local collection 44(1) and 44(2) is configured to store up to four execution contexts 46. When a fifth execution context 40 is unblocked when four execution contexts 46 are already in a local collection 44, scheduler 22 spills over the least recently added execution context 46 into runnables collection 82(1) of schedule group 80(1). In the example of FIG. 5B, scheduler 22 spills over execution context A from local collection 44(1) into runnables collection 82(1) as indicated by an arrow 94 to allow execution context E to be added to local collection 44(1). Likewise, scheduler 22 spills over execution context V from local collection 44(2) into runnables collection 82(1) as indicated by an arrow 96 to allow execution context Z to be added to local collection 44(2).

An arrow 98 indicates an order that execution contexts 46(1) and 46(2) were added to respective local collections 44(1) and 44(2) where a time t1 occurs before a time t2 (i.e., t1<t2). In addition, an arrow 99 indicates a likeliness spectrum of how hot data corresponding to execution contexts 46(1) and 46(2) is in the memory hierarchy of hardware threads 16(1) and 16(2) that correspond to respective virtual processors 32(1) and 32(2).

When virtual processors 32(1) and 32(2) become available, virtual processors 32(1) and 32(2) will first attempt to locate a respective runnable execution context 46(1) and 46(2) in respective local collections 44(1) and 44(2) as described above with reference to FIG. 3. In the example of FIG. 5B, virtual processor 32(1) removes and executes execution context E (i.e., the most recently added execution context 46(1)), and virtual processor 32(2) removes and executes execution context Z (i.e., the most recently added execution context 46(2)). As illustrated by arrow 99, execution contexts E and Z are most likely to have the hottest data in the respective memory hierarchies of respective hardware threads 16(1) and 16(2). For example, if the above execution contexts 34, 40, and 46 operate on a large numeric matrix, then a large amount of the matrix data associated with execution contexts E and Z is likely to be high in the respective memory hierarchies accessible to respective hardware threads 16(1) and 16(2) (e.g., very hot in respective caches accessible to respective hardware threads 16(1) and 16(2)).

Eventually, the runnable execution contexts 46(1) and 46(2) in local collections 44(1) and 44(2) are executed by virtual processors 32(1), 32(2), and/or by other virtual processors 32 that steal execution contexts 46(1) and/or 46(2) from local collections 44(1) and/or 44(2) as described above with reference to FIG. 3.

When an available virtual processor 32 is unable to locate a runnable execution context 46 in a corresponding local collection 44, the virtual processor 32 attempts to locate a runnable execution context in the following order until a runnable execution context is found. The virtual processor 32 looks in the runnable collection 82 in a corresponding schedule group 80, then round robins through the local collections 44 of other virtual processors 32, and then round robins through the runnable collections 82 in the remaining schedule groups 80.

If no runnable execution context is found in scheduler 22, the virtual processor 32 attempts to steal an unrealized task 42 from a workstealing queue 86. Accordingly, scheduler 22 attempts a generalized steal only after failing to find a runnable execution context within a corresponding local collection 44, the corresponding schedule group 80, other local collections 44, and the remaining schedule groups 80.

In the example of FIGS. 5A-5B, an available virtual processor 32(3) (not shown in FIGS. 5A-5B) that did not locate a runnable execution context within a local collection 44(3) (not shown) or the runnables collection 82(2) of a corresponding schedule group 80(2), may steal execution context B from local collection 44(1) (i.e., the least recently added execution context 46(1)) or execution context W from local collection 44(2) (i.e., the least recently added execution context 46(2)). If local collections 44(1) and 44(2) and the remaining local collections 44 were empty, then virtual processor 32(3) may steal execution context V from runnables collection 82(1) of a corresponding schedule group 80(1).

Figure 6A:
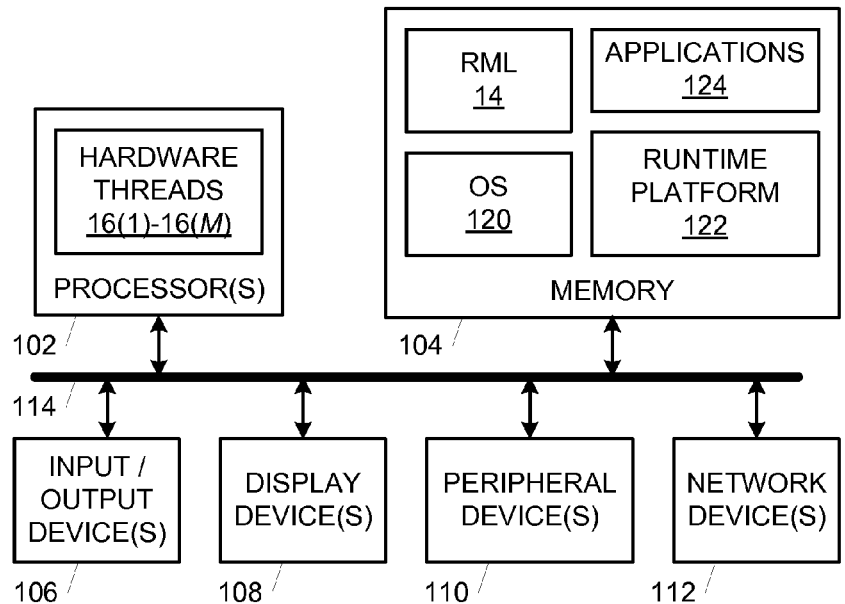
FIGS. 6A-6B are block diagrams illustrating embodiments of a computer system configured to implement a runtime environment including a scheduler with local collections of tasks.
Figure 6B:
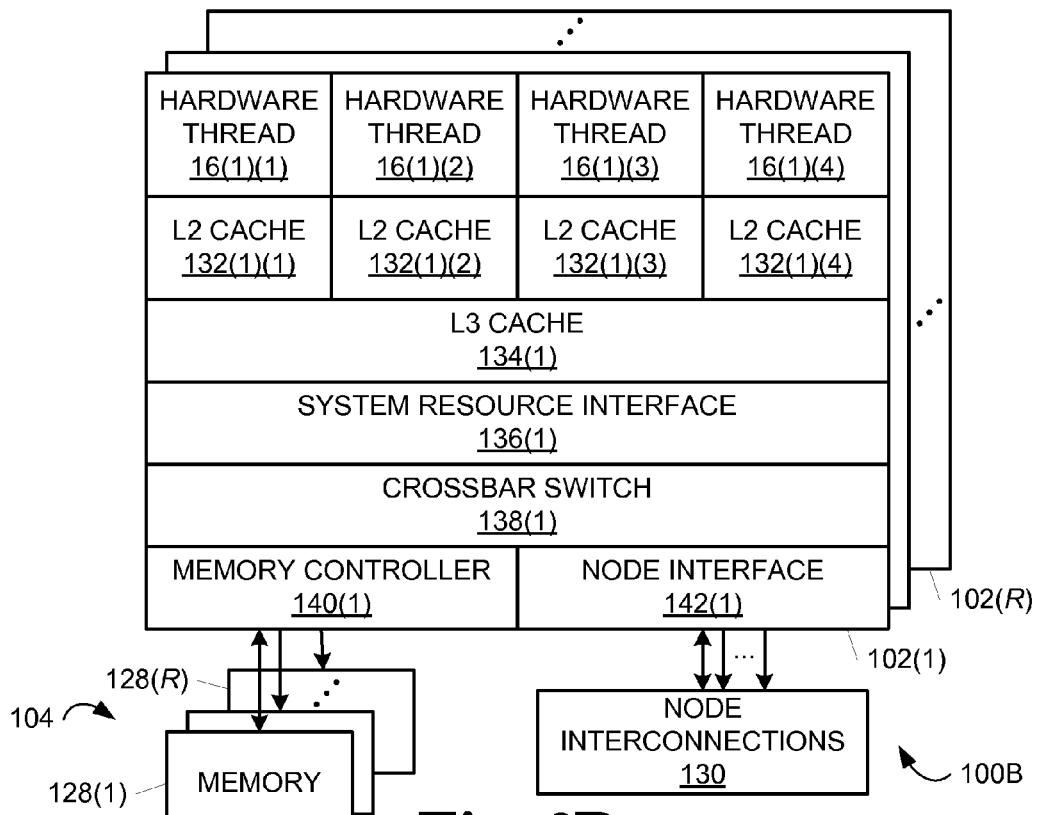

FIGS. 6A-6B are block diagrams illustrating embodiments 100A and 100B, respectively, of a computer system 100 configured to implement runtime environment 10 including scheduler 22 with local collections 44(1)-44(N).

As shown in FIG. 6A, computer system 100A includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100A represents any suitable processing device configured for a general purpose or a specific purpose. Examples of computer system 100A include a server, a personal computer, a laptop computer, a tablet computer, a personal digital assistant (PDA), a mobile telephone, and an audio/video device. The components of computer system 100A (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), an operating system (OS) 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100A boots and executes OS 120. OS 120 includes instructions executable by hardware threads 16 to manage the components of computer system 100A and provide a set of functions that allow applications 124 to access and use the components. In one embodiment, OS 120 is the Windows operating system. In other embodiments, OS 120 is another operating system suitable for use with computer system 100A.

Resource management layer 14 includes instructions that are executable in conjunction with OS 120 to allocate resources of computer system 100A including hardware threads 16 as described above with reference to FIG. 1. Resource management layer 14 may be included in computer system 100A as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100A as part of an application 124, as a library of functions available to one or more applications 124, or as an integrated part of OS 120 and or resource management layer 14.

Each application 124 includes instructions that are executable in conjunction with OS 120, resource management layer 14, and/or runtime platform 122 to cause desired operations to be performed by computer system 100A. Each application 124 represents one or more processes, such as process 12 as described above, that may execute with scheduler 22 that uses local collections 44(1)-44(N) as provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100A and output instructions or data from computer system 100A to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100A. Examples of display devices 108 include a monitor, a display screen, and a projector.

Peripheral devices 110 include any suitable type, number, and configuration of peripheral devices configured to operate with one or more other components in computer system 100A to perform general or specific processing functions.

Network devices 112 include any suitable type, number, and configuration of network devices configured to allow computer system 100A to communicate across one or more networks (not shown). Network devices 112 may operate according to any suitable networking protocol and/or configuration to allow information to be transmitted by computer system 100A to a network or received by computer system 100A from a network.

FIG. 6B is a block diagram illustrating embodiment 100B of computer system 100. Computer system 100B also includes at least processor packages 102 and memory system 104. Processor packages 102 include processor packages 102(1)-102(R) and memory system 104 includes memory devices 128(1)-128(R) where R is an integer than is greater than or equal to two and represents the Rth processor package 102 and Rth memory device 128. OS 120, runtime platform 122, applications 124, and resource management layer 14 may each be stored in any suitable ones of memory devices 128(1)-128(R).

In the embodiment of FIG. 6B, each processor package 102(1)-102(R) and respective memory device 128(1)-128(R) form a node. The nodes are interconnected with any suitable type, number, and/or combination of node interconnections 130.

Each processor package 102 includes a set of hardware threads 16(1)-16(4) where each hardware thread includes an L1 (level one) cache (not shown). Each processor package 102 also includes a set of L2 (level two) caches 132(1)-132(4) that correspond to respective hardware threads 16(1)(1)-16(1)(4). Each processor package 102 further includes an L3 (level three) cache available to the set of hardware threads 16(1)-16(4), a system resource interface 136, a crossbar switch 138, a memory controller 140, and a node interface 142. System resource interface 136 provides access to node resources (not shown). Crossbar switch 138 interconnects system resource interface 136 with memory controller 140 and node interface 142. Memory controller 140 connects to a memory device 128. Node interface 142 connects to one or more node interconnections 130.

With reference to the embodiments described above in FIGS. 1-5B, scheduler 22 may attempt to exploit memory locality effects in computer system 100B using local collections 44. For example, when a task 36 executing on an execution context 34 on hardware thread 16(1)(1) via a virtual processor 32(1) unblocks a task 41 with an execution context 40, at least some data that the task 41 will consume is likely in the L1 cache (not shown), L2 cache 132(1)(1), and/or L3 cache 134(1) of processor package 102(1). By assigning the unblocked task 41 to local collection 44(1), scheduler 22 increases the likelihood that the task 41 will be executed by hardware thread 16(1)(1) via virtual processor 32(1) and exploit the hot data in the L1 cache (not shown), L2 cache 132(1)(1), and/or L3 cache 134(1).

The use of local collections in schedulers as described above may provide a scheduler with the ability to weight the execution of wait-dependent execution contexts and maximize memory locality effects between wait-dependent execution contexts. As a result, the scheduler may increase the likelihood that wait-dependent execution contexts will be executed on the same hardware resource.

In addition, by including selected work stealing concepts into the above embodiments, the scheduler may preserve fairness and forward progress amongst the execution contexts.

The local collections may also reduce contention between processing resources that are searching for execution contexts to execute. As a result, the scheduler may also scale to computer systems with a large number of processing resources.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
creating, in a process executing on a computer system, a scheduler comprising:
a plurality of local collections having a corresponding local collection of tasks for each processing resource of a plurality of processing resources allocated to the scheduler and including a first corresponding local collection associated with a first one of the plurality of processing resources; and
at least one general collection of tasks including a first task,
detecting that the first task has become unblocked by a second task executing on the first one of a plurality of processing resources; and
assigning the first task to the first corresponding local collection.

2. The method of claim 1 further comprising:
detecting that a third task in the scheduler has become unblocked by a fourth task executing on a second one of the plurality of processing resources allocated to the scheduler; and
assigning the third task to a second one of the plurality of local collections associated with the second one of the plurality of processing resources.

3. The method of claim 1 further comprising:
in response to detecting that the first one of the plurality of local collections is full, reassigning a third task in the first one of the plurality of local collections to a general collection upon assigning the first task to the first one of the plurality of local collections.

4. The method of claim 3 wherein the third task is the least recently added task in the first one of the plurality of local collections.

5. The method of claim 1 further comprising:
assigning a third task to a general collection in the scheduler.

6. The method of claim 1 further comprising:
in response to the first task being the most recently added task in the first one of the plurality of local collections when the first one of the plurality of processing resources becomes available, executing the first task with the first one of the plurality of processing resources.

7. The method of claim 1 further comprising:
in response to the first task being the least recently added task in the first one of the plurality of local collections when a second one of the plurality of processing resources becomes available, executing the first task with the second one of the plurality of processing resources.

8. A method performed by a scheduler in a process executing on a computer system, the method comprising:
in response to a first processing resource of the scheduler becoming available, attempting to locate a runnable execution context in a first local collection corresponding to the first processing resource;
in response to the runnable execution context not being present in the first local collection, attempting to locate the runnable execution context in a general collection of the scheduler; and
in response to the runnable execution context not being present in the general collection, attempting to locate the runnable execution context in a second local collection corresponding to a second processing resource of the scheduler.

9. The method of claim 8 further comprising:
in response to the runnable execution context being present in the first local collection, executing the runnable execution context from the first local collection with the first processing resource.

10. The method of claim 9 wherein the runnable execution context present in the first local collection is the most recently added execution context in the first local collection.

11. The method of claim 8 further comprising:
in response to the runnable execution context not being present in the first local collection and the runnable execution context being present in the general collection, executing the runnable execution context from the general collection with the first processing resource.

12. The method of claim 8 further comprising:
in response to the runnable execution context not being present in the first local collection and the general collection and the runnable execution context being present in the second local collection, executing the runnable execution context from the second local collection with the first processing resource.

13. A computer readable memory storing computer-executable instructions that, when executed by a computer system, perform a method comprising:
creating, in a process executing on the computer system, a scheduler with at least one general collection of tasks including a first task of a wait-dependent execution context and a separate local collection of tasks for each of a plurality of processing resources allocated to the scheduler including a first local collection associated with a first one of the plurality of processing resources; and
assigning the first task to the first local collection in response to the first one of the plurality of processing resources causing the first task to become unblocked.

14. The computer readable memory of claim 13, the method further comprising:
assigning a second unblocked task in the scheduler to the local collection corresponding to a second one of the plurality of processing resources that caused the second unblocked task to become runnable.

15. The computer readable memory of claim 13, the method further comprising:
in response to detecting that the local collection corresponding to the first one of the plurality of processing resources is full, moving a second unblocked task from the local collection to the general collection.

16. The computer readable memory of claim 13, the method further comprising:
assigning a new task received by the scheduler to the general collection.

17. The computer readable memory of claim 13, the method further comprising:
in response to the first unblocked task being the most recently added task in the local collection corresponding to the first one of the plurality of processing resources when the first one of the plurality of processing resources becomes available, executing the first unblocked task with the first one of the plurality of processing resources.

18. The computer readable memory of claim 13, the method further comprising:
in response to the first unblocked task not being the most recently added task in the local collection corresponding to the first one of the plurality of processing resources when the first one of the plurality of processing resources becomes available, executing a second unblocked task that is the most recently added task in the local collection corresponding to the first one of the plurality of processing resources with the first one of the plurality of processing resources.

19. The computer readable memory of claim 13, the method further comprising:
in response to the first unblocked task being the least recently added task in the local collection corresponding to the first one of the plurality of processing resources when a second one of the plurality of processing resources becomes available, executing the first task with the second one of the plurality of processing resources.

* * * * *